$t_1$; START OF FOAMING
$t_2$; COMPLETION OF FOAMING

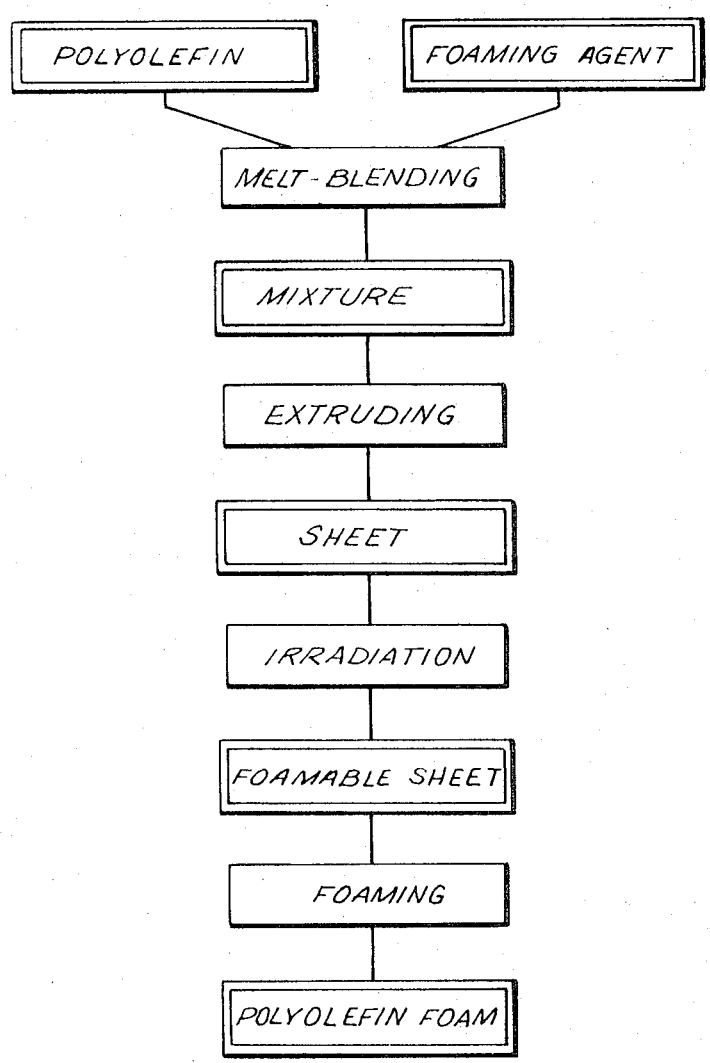

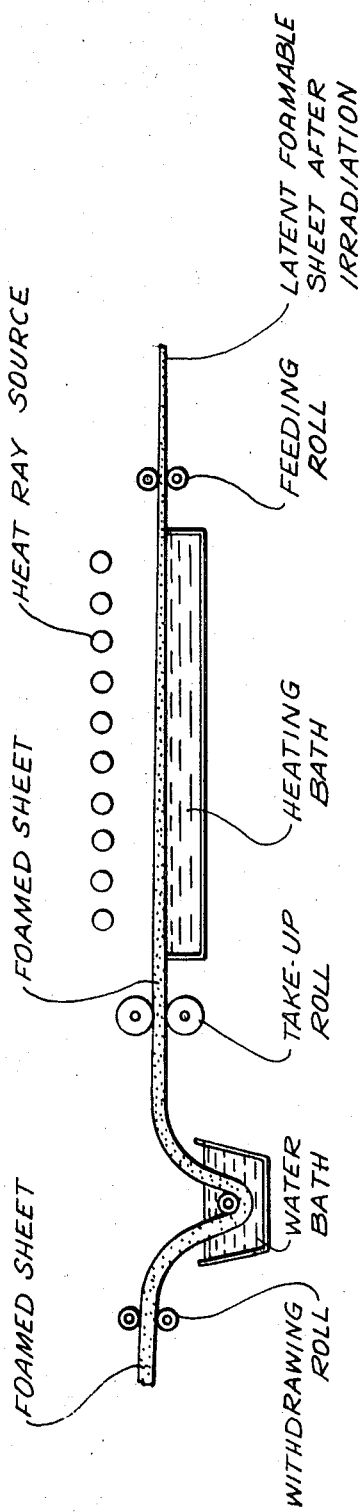
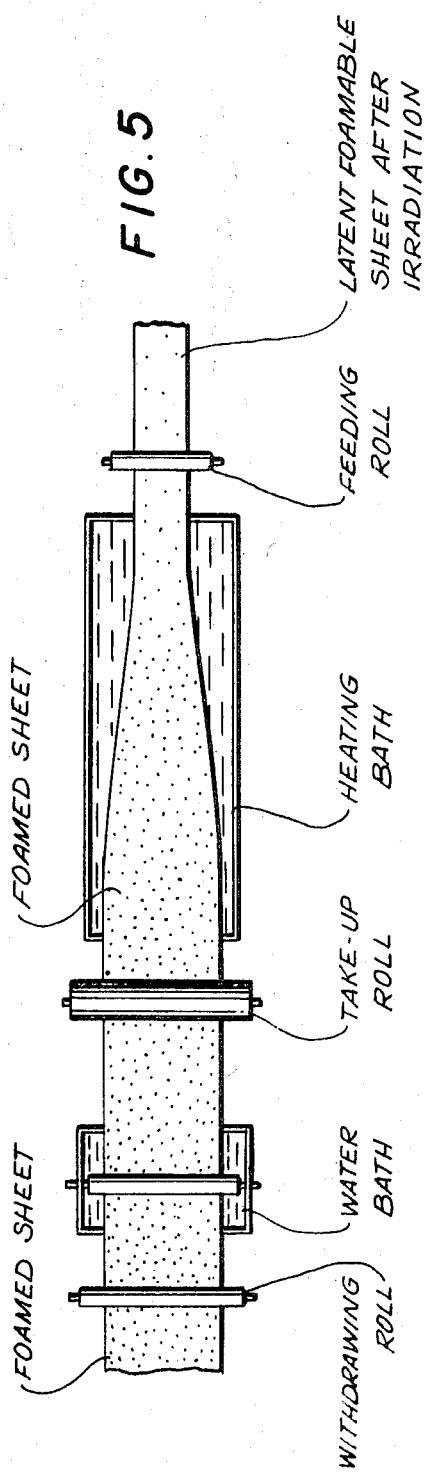

United States Patent Office 3,562,367
Patented Feb. 9, 1971

3,562,367
PROCESS FOR PRODUCING THERMOPLASTIC
RESIN FOAM
Yasuo Shinohara, Toshimasa Takahashi, and Kenji Yamaguchi, Ohtsu-shi, Japan, assignors to Toyo Rayon Kabushiki Kaisha, Tokyo, Japan, a corporation of Japan
Filed Feb. 25, 1965, Ser. No. 435,285
Claims priority, application Japan, Feb. 27, 1964,
39/10,606; Mar. 9, 1964, 39/12,870; Sept. 25,
1964, 39/54,303; Sept. 29, 1964, 39/54,738; Oct.
15, 1964, 39/58,329
Int. Cl. B29d 7/02, 7/14; H05b 7/16
U.S. Cl. 264—25                              9 Claims

ABSTRACT OF THE DISCLOSURE

The production of a foamed thermoplastic resin by applying an ionizing radiation to a sheet which is formed of an olefinic resinous composition and a foaming agent, and thereafter floating the sheet on a heated bath while irradiating it from above with heat rays.

Figure 1:
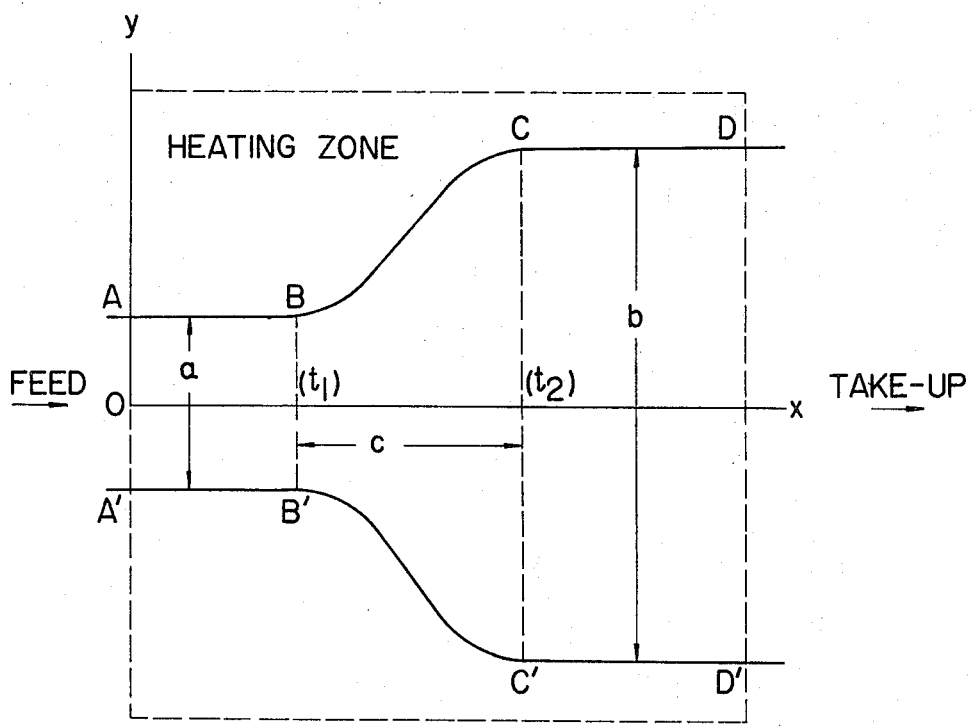

This invention relates to a process for producing sheetlike foamed material predominantly of closed cells, the base of which is a resin containing olefins as its constituent units.

Numerous processes are known of producing foamed material having as its base a polyolefin resin or a resin predominantly of polyolefin (hereinafter to be referred to as just polyolefin). For example, according to U.S. Pat. 2,256,483, a cellular polyethylene can be obtained by incorporating in molten polyethylene a gas under pressure and thereafter extruding this mixture into a low pressure zone. On the other hand, U.S. Pat. 2,387,730 discloses a process whereby a corklike product is obtained from polyethylene by placing a molten polymer under pressure of a gas capable of dissolving therein, followed by reducing the pressure partially while maintaining the temperature to foam the polymer, then cooling the polymer under the residual pressure, and finally releasing the residual pressure. Further, a process is also known, wherein polyethylene and a normally gaseous foaming agent are mixed under pressure and thereafter, in foaming the mixture by extruding it into a low pressure zone, the mixture is applied a radiation of 0.9-19 mrads per gram to foam the fine cells uniformly and thoroughly.

These processes, however, exhibit many defects when applied to the commercial manufacture of polyethylene foam, and particularly its sheetlike foam, namely, in the case of both U.S. Pats. 2,256,483 and 2,387,730, special and complicated equipment are needed in the foaming and cooling steps, for obtaining a uniform cellular structure, and also good foam cannot be obtained unless very close attention is paid to the conditions of operation. Further, the incorporation quantitatively of a normally gaseous agent into a molten resin under pressure, for obtaining the desired degree of foam, requires a very complicated operation. On the other hand, while it is possible to obtain a uniform cellular structure relatively easily with the irradiation process, the operations for obtaining the desired degree of foaming also becomes complicated. Further, since in the irradiation process the maintenance of the foam immediately after it has been foamed and its cooling is difficult, it is, as a practical matter, impossible to obtain a wide sheetlike foam (e.g., of a thickness of not more than 2 cm. and a width of more than one meter).

A primary object of the present invention is to provide a continuous and commercially stable process for producing a shetlike foam having uniform and closed cells, which has been foamed to the desired degree, using polyolefins as the base. Other objects will be apparent from the following description.

The sheetlike foam of the present invention is made by the steps comprising adding to a resin composition containing olefin as its constituent units a chemical forming agent, and, if necessary, additives such as dispersants, pigments, stabilizers, age resistors and fillers, melt-blending the mixture and forming the mixture into sheets, applying to this sheet an ionizing radiation of 0.5-50 mrads, and preferably 1-10 mrads, and thereafter feeding this sheet onto a heating liquid and irradiating it from above with infra-red radiation to accomplish the foaming by heating. This process will be fully described hereinafter. In the description, which follows, the parts and percentages indicate parts and percentages on a weight basis, unless otherwise noted.

The term "resin compositions containing olefins as its constituent units," as used herein, denotes polyolefins, a resin composition predominantly of polyolefins, or a copolymer of an olefin with another monomer, and is a generic term which includes: (I) the homopolymers of the aliphatic olefins such as, e.g., polyethylenes obtained by the low, medium and high pressure processes, atactic or isotactic polypropylene and polybutenes; or the copolymers thereof or polymeric mixtures of two or more thereof mixed in optional proportions; (II) mixtures comprising 100 parts of foregoing polymer composition given in (I), above with which have been blended 10–500 parts of a rubber component such as, e.g., natural rubber, polycisbutadiene rubber, polychloroprene rubber, acryl rubber, polyisobutyl rubber, nitrile butadiene rubber, styrene-butadiene rubber or silicone rubber; (III) the polymer compositions given in (I), above, with which, after the mixing, is mixed a vinyl acetate-ethylene copolymer which contains 5–50% by weight of vinyl acetate in terms of monomeric units; and (IV) the ethylene-vinyl acetate copolymers containing at 50–95% by weight of ethylene, or polymer mixtures of two or more thereof.

The term "chemical foaming agent," as used herein, denotes a chemical which is liquid or solid at room temperature but which, upon being heated, decomposes and evolves a gas; included being such as, e.g., azodicarbonamide, trihydrazino-sym-triazine, pp'-oxybis benzenesulfonylhydrazide, hydrazodicarbonamide, dinitroso-pentamethylene-tetramine, azobisisobutylodinitrile and p-toluenesulfonyl hydrazide. One which is suitable for the basic polymer is chosen from among these foaming agents, in consideration of such as the foaming temperature, the amount of gas evolved and affinity for the base polymer. For example, when the base polymer contains a large amount of polyethylene, it is preferred to use one having a high decomposing temperature, such as azodicarbonamide. Further, foaming assistants which regulate the decomposition of these chemical foaming agents may also be used conjointly.

The hereinbefore described polyolefin resin composition or a predominantly polyolefin resin composition and a chemical foaming agent are melted and kneaded by means of a suitable method, other additives being added, if desired. The melting and kneading may be by any of the methods such as by means of a Banbury mixer, kneading rolls, screw extruder, etc., there being no particular restrictions according to the present invention, so long as a uniform mixture is achieved and there is no substantial decomposition or deterioration of the chemical foaming agent during the melting and kneading step or a deterioration of the base polyolefin. After the melting and kneading has been thoroughly accomplished, the mixture is made into sheet form. The means for forming the mixture into sheets include, such as, for example, the methods by means of a hot press, calender rolls, sheet extruders, etc., but in this case also, there are no restrictions so long as the same conditions as noted in the case of melting and kneading are satisfied.

The sheet obtained, after having passed through the steps hereinabove described, is then irradiated with an ionizing radiation. The term "ionizing radiation," as used herein, is a generic term for those radiations having an ionizing capacity, such as electron rays, gamma rays, X-rays, neutron rays and proton rays. Any one of these may be employed, and further a concurrent use of two or more of these rays is also permissible. In addition, as a means for curtailing the dosage required, a sensitizer such as monochlorobenzene, divinyl benzene, glycidyl methacrylate, diallyl maleate, and acetylene may also be used. However, in the case of those whose cross-linkability is especially good, such as polyethylene, the use of these sensitizers are not necessarily required. This irradiation with ionizing rays is an important step in this invention, its purpose being to impart a slight degree of cross linking to the base polyolefin and, as a result, to impart to it a certain degree of form retentiveness. Should the sheet become completely liquified under the heating conditions at which the foaming is to be carried out, in most cases a good foamed material is not obtainable since the gas that evolves upon decomposition of the foaming agent escapes. Further, especially in the case of a continuous process as in this invention, the foamed sheet cannot be taken up. Hence, it is required that a suitable degree of cross linking be imparted such that the sheet under the heating conditions employed can fully swell under the pressure of the gas evolved by decomposition of the foaming agent, and at the same time possess a degree of fluidity as will enable it to be smoothly taken up also.

While the application of radiation is normally carried out in air at room temperature, it may, if necessary, be carried out in vacuum or nitrogen, or in an atmosphere of other gases, while heating or cooling the sheet. In these cases also, it goes without saying, that the heating must be in a range as will not decompose the foaming agent. The dosage required of the radiation will vary depending on such the class of polyolefin and chemical foaming agent used, the methods of applying the radiation, etc., but normally employed is 0.1 to 50 mrads, and preferably 1 to 10 mrads.

Since the sheet obtained, as hereinabove described, has a degree of cross linking imparted to its base polyolefin as will not permit the escape of the gas which evolves upon being applied a suitable radiation, it is provided with a property whereby upon decomposition of the foaming agent by heating it softens and forms a good foamed structure. As methods of heating this foamable sheet, known are such as the method of heating the sheet in air, the method of heating it in a heated liquid, etc. However, these methods cannot be employed when producing sheetlike foamed structure particularly continuously. Namely, since the foamable sheet which is in the process of being foamed is in a softened state due to its being heated, it is a difficult matter to hold it in a flat state. Further, even supposing it were possible to hold it in a flat state by some means or other, since the volume of the sheet is increasing by being foamed, the heating and foaming operation cannot be carried out continuously, to say the least of it. That it was not possible to effect the heating and foaming operation continuously because of the foregoing reason was the major cause why sheetlike foamed structures were difficult of obtaining heretofore, though their appearance was hoped for.

This point having attracted our attention, we engaged in extensive research concerning the subject, with the consequence that we have discovered a new heating and foaming process as is described hereinafter. Namely, the process is one in which the foamable sheet, obtained as hereinbefore described, is floated on the surface of a liquid heated to a temperature which is suited for effecting the foaming and there heated from above with heat rays to effect the three-dimensional foaming and spreading out of the sheet, thereby to accomplish the foaming operation.

Although the temperature of the heating bath will vary depending upon the class of the base polymer and the class of foaming agent used, it is maintained at about 120–300° C., and preferably 150–250° C.

As the heating liquid, any may be used so long as its heat stability is good and it does not stain or decompose said foamable sheet. Preferably used are, however, ethylene glycol, polyethylene glycol, silicone oil, molten mixtures of low melting nitrates, or the melts of easily melted metal alloys. Further, when the specific gravity of the shaped structure is greater than that of the liquid being used, the floating of the shaped structure on the liquid may be accomplished after making its specific gravity smaller than that of the liquid used either by giving the shaped structure a preliminary foaming by dipping it in an identical liquid or by placing it in a hot air furnace. The liquid or solid salt mixture adhering to the foamed final product can be easily washed away with a solvent such as water or acetone. In order to prevent the adherence of alloys or their oxides when using melts of low melting alloys, it is preferred to cover the surface of melt with such liquids as ethylene glycol, polyethylene glycol and silicone oil.

As the source of infrared rays, the usual infrared electric lamp having a maximum radiant energy value at 1.15 microns or a quartz tube heater can be used. Besides these, a heat source having an intense spectrum in the appropriate wavelengths, such as, for example, a suitable heated metal, heated sheet metal, etc., may be suitably chosen and used. When employing infrared electric lamps or heaters, since their output and placement have an intimate relationship to the energy density required at the surface of the molded sheet, the equipment must be so designed that the radiant energy is distributed uniformly over the entire surface of the molded sheet. No particular restriction is imposed on the intensity of the radiation, an effective dosage being chosen as required. However, a dosage greatly in excess must be avoided as this will cause a deterioration of the base polymer and a possibility that the performance of the foamed structure will be impaired. Since the maximum limit of the intensity of irradition will vary greatly depending upon the base polymer, the performance required in the product foamed sheet, etc., the dosage to be applied must be determined for each case, as required.

The greatest advantage of the method of heating according to this invention wherein heating of the foamable sheet is carried out by heating above a liquid and from above by means of heat rays lies in the point that (1) a perfectly flat foamed structure can be obtained since no implements for supporting the sheet is used and the foaming of the sheet can take place freely and smoothly above the liquid surface, and (2) a foamed structure which is uniformly foamed can be obtained by applying heat uniformly to the sheet from its two sides by suitably adjusting the temperature of the liquid bath and the amount of heat applied by means of radiation.

The sheet whose foaming has been thus achieved is cooled and set by a suitable method to become a sheetlike foamed structure.

Next, a preferred mode of operation for producing the sheetlike foamed structure continuously by means of the hereinbefore described steps will be presented.

A suitable oil, say, a polyalkylene glycol, is added to polyethylene in chip form, which is to become the base, after which the mixure is mixed in a V blender to moisten the surface of the chips thoroughly. Then, after adding a chemical foaming agent and other additives, the mixture is again thoroughly mixed in a V blender. By these operations, the chips are completely covered with the foaming agent and other additives. These covered chips are melt-blended in a pelletizer and made into mixed pellets. The resulting pellets are formed into a sheet by means of a pelletizer and then applied a radiation continuously using an electron accelerator, after which the sheet is fed to a tank provided at its front and rear ends with feed and take-up rolls, respectively, and on top with quartz tube-enclosed infrared heaters, the sheet being fed from one end of the tank continuously by means of said feed roll to the liquid surface of the molten salt bath contained in said tank to be heated and foamed. Then, by drawing the foamed sheet continuously from the other end by means of the take-up roll and cooling it, a flat foamed sheet can be obtained.

A noteworthy fact by which the invention process could be conducted to advantage was found in the heating and foaming step. This fact will be described with reference to the accompanying drawings.

Figure 2:
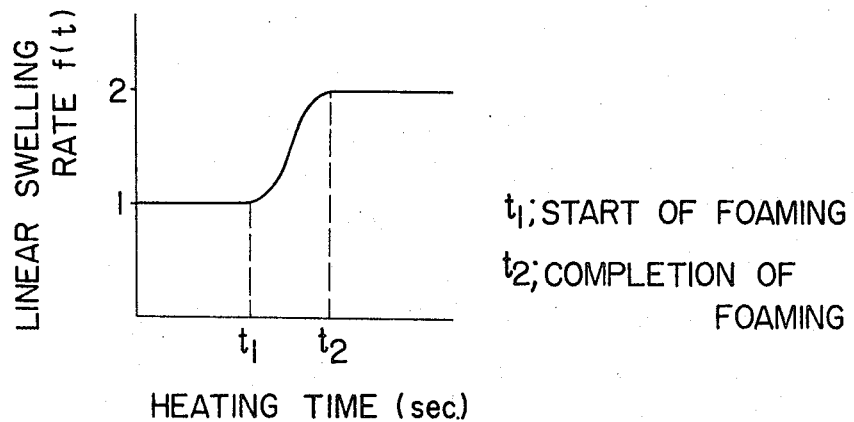

FIG. 1 shows a foamable sheet which has been placed in the aforesaid heating and foaming step and which foams in the directions of its thickness, length and width. In this figure, the state of foaming, as such from a direction at right angles to the sheet surface is shown, and FIG. 2 is a diagram of the foaming rate of the sheet with respect to time, FIG. 3 is a flow sheet showing the process of the invention; and FIGS. 4 and 5 are diagrammatic side and plan views respectively of the apparatus for effecting the process.

In FIG. 1, a foamed sheet is continuously produced by feeding a foamable sheet from the left side of FIG. 1, heating and foaming it in the heating zone to foam the sheet in the direction of its width, length and thickness, and thereafter taking it out from the right side of the figure. The foregoing noteworthy fact was that when letting the width of the foamed sheet prior to its foaming be $a$, the width when the foaming is completed, $b$, and the distance between the point the foaming starts and ends, $c$, if the relation of $$\frac{b-a}{c} \leq 0.75$$

holds, a good foamed sheet could be continuously produced. This will be described more fully hereinafter.

In FIG. 1, letting curves ABCD and A'B'C'D' indicate the foaming curves of the foamable sheet and O, the datum point when the left end of the heating zone is made the $y$ axis and the centerline of the sheet, the $x$ axis. Now, the shape of the foaming curves ABCD (A'B'C'D') are obtained.

Assuming that the sheet is isotropic and foams uniformly three-dimensionally, now if its foaming state is shown with respect to time, a linear foaming rate curve $f(t)$, as shown in FIG. 2, will be obtained. Although $f(t)$ will vary depending upon the extent to which the heating zone is heated, the class and amount of the foaming agent, and the class of the resin, the relationship of $f(o)=1$ and $f(t)=f\infty(t=t_2)$ always holds. Further, if the volumetric foaming rate is made Q, then $f\infty=Q^{1/3}$.

Employing this relationship $f(t)$, the foregoing foaming curve ABCD (A'B'C'D') is obtained by $$x = v \int_0^t f(t) dt$$

$$y = \frac{a}{2} f(t)$$

wherein $v$ represents the rate of feed of the foamable sheet. From this equation, the take-up speed at which the sheet is taken up without being allowed to slacken or stretched becomes $$\left(\frac{dx}{dt}\right) t = \infty = v\{f(t)\} t = \infty = vf_\infty = vQ^{1/3}$$

This type of calculation only holds in an ideal case, and since in practice neither is the heating zone completely uniform nor is the foamable sheet isotropic, some error will occur by the use of the foregoing equation. However, it can be regarded that basically the foregoing equations hold. Thus, when observations are made on the basis of these equations, the following facts become apparent.

(1) When the degree of foam and width of the foamable sheet and its rate of feed are made constant, and the temperature of the heating zone is changed, wrinkles appear in the foamed sheet at a heating temperature above a certain point. That is to say, when width $a$ of the foamable sheet and width $b$ of the foamed sheet are constant, the distance $c$ of the heating zone becomes smaller as the heating temperature is increased, and above a certain temperature wrinkles appear.

(2) When the heating temperature, degree of swell and the feed rate are made constant and the width $a$ of the foamable sheet is varied, wrinkles appear when width $a$ becomes greater than a certain value.

(3) When the heating temperature, feed rate and the width of the foamable sheet are made constant and the degree of foam is varied, wrinkles appear when the degree of foam is made greater than a certain value.

Thus, it is seen from these facts that the curve between B and C of the foaming curve must not be one whose rise is an abruptness exceeding a certain extent for practicing this continuous process commercially. Namely, it is seen that when a foamable sheet having width $a$ foams a foamed sheet having width $b$ (the distance between being $c$), the valve of $$\frac{b-a}{2c}$$

must not be more than a certain value.

When the value of $$\frac{b-a}{2c}$$

was obtained for each case at the limits of wrinkle appearance, it was found to be roughly 0.75, though some errors exist. Hence, it was found that for producing continuously good foamed sheets without the appearance of the aforesaid wrinkles, a heating and foaming condition wherein $$\frac{b-a}{2c} \leq 0.75$$

is a necessary requirement.

According to the invention process which has been fully described above, sheetlike foamed structures with polyolefin or resins predominantly polyolefins as the base, and composed of independent cells can be continuously produced, the sheetlike foamed structures obtained moreover being of such good shape as was not possible of obtaining in the past by a continuous production process.

The following examples are given for illustrating specific modes of practicing the invention. These examples are however for illustrating the invention and not in limitation thereof.

EXAMPLE 1

A metallic tank 40 cm. long, 20 cm. wide and 10 cm. deep is filled with an alloy composed of 40 parts lead and 60 parts tin, after which heating was applied by means of a sheathed heater provided in the tank to melt the alloy and make the molten metal bath. At a point about 20 cm. above the tank, which had a cover, were disposed 5 40-cm.-long infrared heaters each having an output of 1 kw. A polyethylene sheet 1.5 mm. thick, 10 cm. long and 5 cm. wide, incorporated with 5% by weight of azodicarbonamide as the chemical foaming agent and irradiated with electron rays, was floated on this metal bath and was applied infrared rays from the top, using a bath temperature of 200° C. The foaming agent was decomposed by the heating and the foaming of the polyethylene took place. With about 2 minutes of heating, the foaming was completed to yield a polyethylene foam having a specific gravity of about 0.08. The polyethylene sheet foaming was effected uniformly three-dimensionally in each direction with no trouble at all and a foamed foam was obtained which was completely similar to the original sheet.

EXAMPLE 2

Except that rolls capable of being varied as to their rotating speed were provided at the two ends of the heating tank, the ratio of rotating speeds of the two rolls being adjusted to 1:2.5, and then the heating and foaming operation was carried out by feeding the sheet via the roll at one end onto the bath and taking it up from the bath by means of the roll at the other end, otherwise this example was carried out under the same conditions as in Example 1 to produce continuously a foamed sheet. The heating and foaming proceeded perfectly smoothly, the feeding of the original sheet and the take-up of the foamed sheet being carried out with no resistance at all to yield a foamed polyethylene sheet having a uniformly flat surface and whose apparent specific gravity was about 0.07.

EXAMPLE 3

When a foamed sheet was produced continuously under conditions entirely identical to those of Example 2 except that as the heating liquid polyethylene glycol was used, a foamed polyethylene sheet having good shape and an apparent specific gravity of 0.07 was obtained.

EXAMPLE 4

When a foamed sheet was produced continuously under conditions entirely identical to those of Example 2 except that as the heating liquid ethylene glycol was used, a foamed polyethylene sheet of good shape and having an apparent specific gravity of 0.07 was obtained.

EXAMPLE 5

A bath (length 70 cm., depth 5 cm., bath temperature 240° C.) was prepared of low melting salts consisting of 53 parts by weight of potassium nitrate, 7 parts by weight of sodium nitrate and 30 parts by weight of sodium nitrite. To this bath from its one end was fed a foamable polyethylene sheet 3 mm. thick and 10 cm. wide which had been incorporated with 10% by weight of azodicarbonamide and irradiated with electron rays. The heating by means of infrared rays was carried out from above the bath, as in Example 1, following which the polyethylene foam (specific gravity about 0.05) foamed about twofold in its width as well as thickness was taken up at the other end of the tank continuously at a speed about three times that at which the sheet was fed. The salt mixture adhering to the back of the foam could very readily be dissolved and removed by rotating the take-up roll in a tank of water heated to about 50° C.

EXAMPLE 6

For the purpose of causing the effects of the present invention to stand out more clearly, this example shows the foaming by another method.

The same foamable polyethylene sheet as used in Examples 2 and 3 was placed on an aluminum plate heated to 200° C., and the heating from above was applied by the same infrared source used in Examples 1, 2 and 3. Although the foaming was completed in about 2 minutes, the foam that was obtained was misshapen and thus unserviceable. This was due to the fact that the foaming did not take place uniformly in its three dimensions because the surface of the foam adhered to the aluminum plate to impede the free expansion of the foam.

EXAMPLE 7

80 parts by weight of low density polyethylene and 20 parts by weight of the various classes of rubber (unvulcanized) enumerated in Table I, below, were thoroughly mixed and kneaded at a temperature of 100–140° C. with a mixing and kneading roll, without using a compounding agent. After adding 6 parts by weight of azodicarbonamide to the kneaded mixture, its mixing and kneading was continued and after about 20 minutes had elapsed, the mixing and kneading was completed. A sheet 10 cm. wide and 3 mm. thick was made from the blends obtained, using a calender roll. After irradiating this sheet with electron rays, it was fed to a foaming bath similar to the one used in Example 2 and heated and foamed under the same conditions as in Example 2, a flat-surfaced foamed sheet having independent cells was obtained.

In the following table are shown the classes of rubber compounded and the apparent specific gravity of the foamed sheet.

TABLE

| Rubber compounded | Irradiation dosage, Mrad | | | | | Color tone | Tensile strength of those irradiated with 6 Mrad, kg./cm.² |
|---|---|---|---|---|---|---|---|
| | 2 | 4 | 6 | 8 | 15 | | |
| Natural rubber | 0.09 | 0.08 | 0.08 | 0.09 | 0.09 | Light yellow | 6 |
| Ethylene propylene rubber | 0.07 | 0.08 | 0.06 | 0.07 | 0.08 | White | 7 |
| Styrene butadiene rubber | 0.09 | 0.09 | 0.09 | 0.10 | 0.10 | do | 5 |
| Nitrile butadiene rubber | 0.10 | 0.10 | 0.11 | 0.11 | 0.11 | Light yellow | 5 |
| Polysis butadiene rubber | 0.09 | 0.08 | 0.09 | 0.10 | 0.10 | White | 8 |
| Neoprene rubber | 0.11 | 0.11 | 0.12 | 0.12 | 0.12 | Light yellow | 6 |

EXAMPLE 8

With a vinyl acetate-ethylene copolymer comprising 18% by weight of vinyl acetate and 82% by weight of ethylene were blended 0.5% by weight, based on said copolymer, of polypropylene of a molecular weight about 2000 and 10% by weight of azodicarbonamide, in the order given, after which this mixture was made into pellets using an extruder. All parts of the extruder was maintained at a temperature of from 130° to 140° C. at this time. These pellets were then made into a continuous sheet having a width of 120 mm. and a thickness of 3 mm. using a sheet extruder having a 120-mm. T dye. This sheet was irradiated with 6 mrads of electron rays by means of a Van de Graff's accelerator. The sheet is then fed continuously to the top of a molten salt bath of 230° C. contained in a tank provided at its two ends with feeding and take-up rolls and above with infrared heaters, where the heating and foaming of the sheet is carried out to yield a good, white foamed sheet. The foamed structure so obtained had a width of 300 mm. and a thickness of 5 mm. and its apparent specific gravity was 0.06.

EXAMPLE 9

With a vinyl acetate-ethylene copolymer comprising 28% by weight of vinyl acetate and 72% by weight of ethylene were mixed 0.5% by weight, based on said copolymer, of polypropylene glycol having a molecular weight of 2000 and 10% by weight of azodicarbonamide, in the order given, and thereafter by following the procedures described in Example 8, a foamed sheet was produced. The process proceeded smoothly and a good foamed sheet similar to that of Example 8 was obtained. This foamed sheet had a width of 27 cm. and a thickness of 5 mm. and its apparent specific gravity was 0.09.

EXAMPLE 10

Twenty parts by weight of polyethylene otbained by the high pressure process and 50 parts by weight of a vinyl acetate-ethylene copolymer consisting of 35% by weight of vinyl acetate and 65% by weight of ethylene were mixed with mixing and kneading rolls at a temperature of 110° C., after which the mixture was cut into chips. Ten percent by weight of azodicarbonamide was mixed with these chips and then by melting and kneading this mixture in an extruder, chips were again made. These chips were made into a sheet 120 mm. wide and 3 mm. thick by using the previously mentioned sheet extruder. Thereafter, the same procedures as described in Example 8 were followed and a white foamed sheet was obtained. This foamed sheet had a width of 30 cm. and a thickness of 5 mm., and its apparent specific gravity was 0.07.

EXAMPLE 11

A sheet 120 mm. wide and 3 mm. thick consisting of 100 parts by weight of polyethylene obtained by the high pressure process and 10 parts by weight of azodicarbonamide was irradiated with 5 mrads of electron rays. This sheet was then continuously fed at the rate of 15 cm./min. onto a molten metal bath at 240° C., the bath being 1000 mm. long and 300 mm. wide and having 10 300-mm.-long infrared lamps each of 1-kw. output disposed above the bath at equidistant intervals. When, at this time, the infrared heaters were adjusted so that the $c$ in FIG. 1 would become 120 mm., a wrinkle about 30 mm. high appeared in the central part and a wrinkle was also retained in the resulting foamed sheet. Next, when the infrared heaters were adjusted so that $c$ would become 240 mm., good foamed sheet could be obtained with no wrinkles at all. The thus obtained foamed sheet had a width of 320 mm. and its apparent specific gravity was about 0.05.

EXAMPLE 12

A foamable sheet, as described in Example 11, was used and adjustments were made to the heating bath and infrared lamps so that $c$ would become 240 mm. When the width $a$ of the sheet was varied diversely, the results obtained showed that at a sheet width above 200 mm. wrinkles always appeared, thus making it impossible to obtain good sheets. Further, while at 190 mm. there were occasions when sheets without wrinkles were obtained, they were exceedingly unstable, and the foaming could not be continued over a prolonged period of time.

The stability became greater as the width $a$ was made small and at less than 120 mm. it was possible to obtain foamed sheets continuously. The width $b$ of the resulting foamed sheet was about 2.5–2.7 times the width $a$ of the foamable sheet.

EXAMPLE 13

The procedure of Example 10 was followed except that the amounts incorporated of the foaming agent azodicarbonamide were varied and 150-mm.-wide foamable sheets having varying degrees of foaming were prepared. The heating bath and infrared lamps were adjusted so that $c$ would become 200 mm. When the several sheets were then continuously foamed, those whose degree of foaming was small could be continuously foamed without trouble, but as the degree of foaming become greater, wrinkles appeared. This critical volumetric foam rate was 15–20 times.

We claim:
1. A continuous process for producing foamed sheets of thermoplastic resins which comprises melt-blending a resinous composition consisting essentially of homopolymers and copolymers of polyolefins with a chemical foaming agent which when heated decomposes and evolves a gas, forming this mixture into a sheet with heat and pressure under conditions in which the chemical foaming agent is not decomposed, applying an ionizing radiation in a dosage of 0.5–50 mrads to said sheet to effect at least partial cross-linking of the resinous compositions, and thereafter moving said sheet continuously such that its under surface floats on the surface of a heating liquid, while irradiating the sheet from above with heat rays to effect the foaming of said sheet freely and in three dimensions, the infeed and take-up of the sheet being related such that width of the sheet during the foaming is increased an amount which satisfies the condition

$$\frac{b-a}{2c} \leq 0.75$$

wherein $a$ represents the width of said sheet prior to its foaming, $b$ the width after foaming, and $c$ the distance from the point at which the foaming of the sheet begins to the point where it ends.

2. The process according to claim 1 wherein said resinous composition is polyethylene.

3. The process according to claim 1 wherein said resinous composition is a vinyl acetate-ethylene copolymer consisting of 5–50% by weight of vinyl acetate and 95–50% by weight of ethylene.

4. The process according to claim 1 wherein the said resinous composition is a mixture of a vinyl acetate-ethylene copolymer with polyethylene, said mixture comprising 5–50% by weight of vinyl acetate and 95–50% by weight of ethylene in terms of monomeric units.

5. The process according to claim 1 wherein said resinous composition is a mixture consisting of 100 parts by weight of polyethylene and 5 to 500 parts by weight of rubber.

6. The process according to claim 1 wherein the temperature of said heating liquid is 120–300° C.

7. The process according to claim 1 wherein said heating liquid is ethylene glycol.

8. The process according to claim 1 wherein said heating liquid is polyethylene glycol.

9. The process according to claim 1 wherein said heating liquid is a molten mixture of alkali nitrite and nitrates.

References Cited

UNITED STATES PATENTS

| | | | |
|---|---|---|---|
| 2,689,982 | 9/1954 | Chynoweth | 264—298X |
| 2,948,665 | 8/1960 | Rubens et al. | 264—53X |
| 2,952,594 | 9/1960 | Rubens | 204—159.2 |
| 3,013,924 | 12/1961 | Taft et al. | 264—47X |
| 3,098,831 | 7/1963 | Carr | 204—159.18X |
| 3,098,832 | 7/1963 | Pooley et al. | 204—159.18X |
| 3,283,043 | 11/1966 | Landler et al. | 264—54 |

FOREIGN PATENTS

| | | | |
|---|---|---|---|
| 558,217 | 6/1958 | Canada | 264—54 |

PHILIP E. ANDERSON, Primary Examiner

U.S. Cl. X.R.

264—54, 177, 234; 260—2.5; 204—159.18, 159.20